United States Patent
Stewart et al.

(10) Patent No.: US 7,168,532 B2
(45) Date of Patent: Jan. 30, 2007

(54) WAVE ENERGY CONVERTER (WEC) WITH MAGNETIC BRAKING

(75) Inventors: David B. Stewart, Cranbury, NJ (US); George W. Taylor, Princeton, NJ (US)

(73) Assignee: Ocean Power Technologies, Inc, Pennington, NJ (US)

(*) Notice: Subject to any disclaimer, the term of this patent is extended or adjusted under 35 U.S.C. 154(b) by 94 days.

(21) Appl. No.: 11/080,581

(22) Filed: Mar. 15, 2005

(65) Prior Publication Data
US 2005/0230206 A1 Oct. 20, 2005

Related U.S. Application Data

(60) Provisional application No. 60/553,666, filed on Mar. 16, 2004.

(51) Int. Cl.
*B60L 7/00* (2006.01)
*F03B 13/10* (2006.01)

(52) U.S. Cl. .............. 188/161; 188/267; 267/140.15; 290/42

(58) Field of Classification Search .............. 188/161, 188/164, 267, 267.2; 267/140.11, 140.14, 267/140.15; 290/42, 43, 53, 54; 60/497, 60/498, 501, 502; 310/14, 15, 17, 23, 24; 417/330, 331
See application file for complete search history.

(56) References Cited

U.S. PATENT DOCUMENTS

| | | | | |
|---|---|---|---|---|
| 4,699,348 A | * | 10/1987 | Freudenberg | 248/550 |
| 5,347,186 A | * | 9/1994 | Konotchick | 310/17 |
| 6,226,989 B1 | * | 5/2001 | Fredriksson et al. | 60/501 |
| 6,644,027 B1 | * | 11/2003 | Kelly | 60/498 |
| 6,791,205 B2 | * | 9/2004 | Woodbridge | 290/53 |
| 6,791,206 B1 | * | 9/2004 | Woodbridge | 290/53 |
| 6,864,592 B1 | * | 3/2005 | Kelly | 290/42 |

* cited by examiner

*Primary Examiner*—Pam Rodriguez
(74) *Attorney, Agent, or Firm*—Henry I. Schanzer

(57) ABSTRACT

A magnetic braking system for inhibiting excessive motion between a float and a column intended to be placed in a body of water; with the float and column moving relative to each other as a function of the waves present in the body of water. The braking system includes a permanent magnetic assembly (PMA) mounted on, and attached to, one of the float and column and a coil assembly (or a conductive plate) mounted on, and attached to, the other one of the float and column. The braking system is mounted such that motion between the float and the column is inhibited when the displacement of the float relative to the column exceeds a predetermined operating range.

16 Claims, 12 Drawing Sheets

FIGURE 1 – PRIOR ART

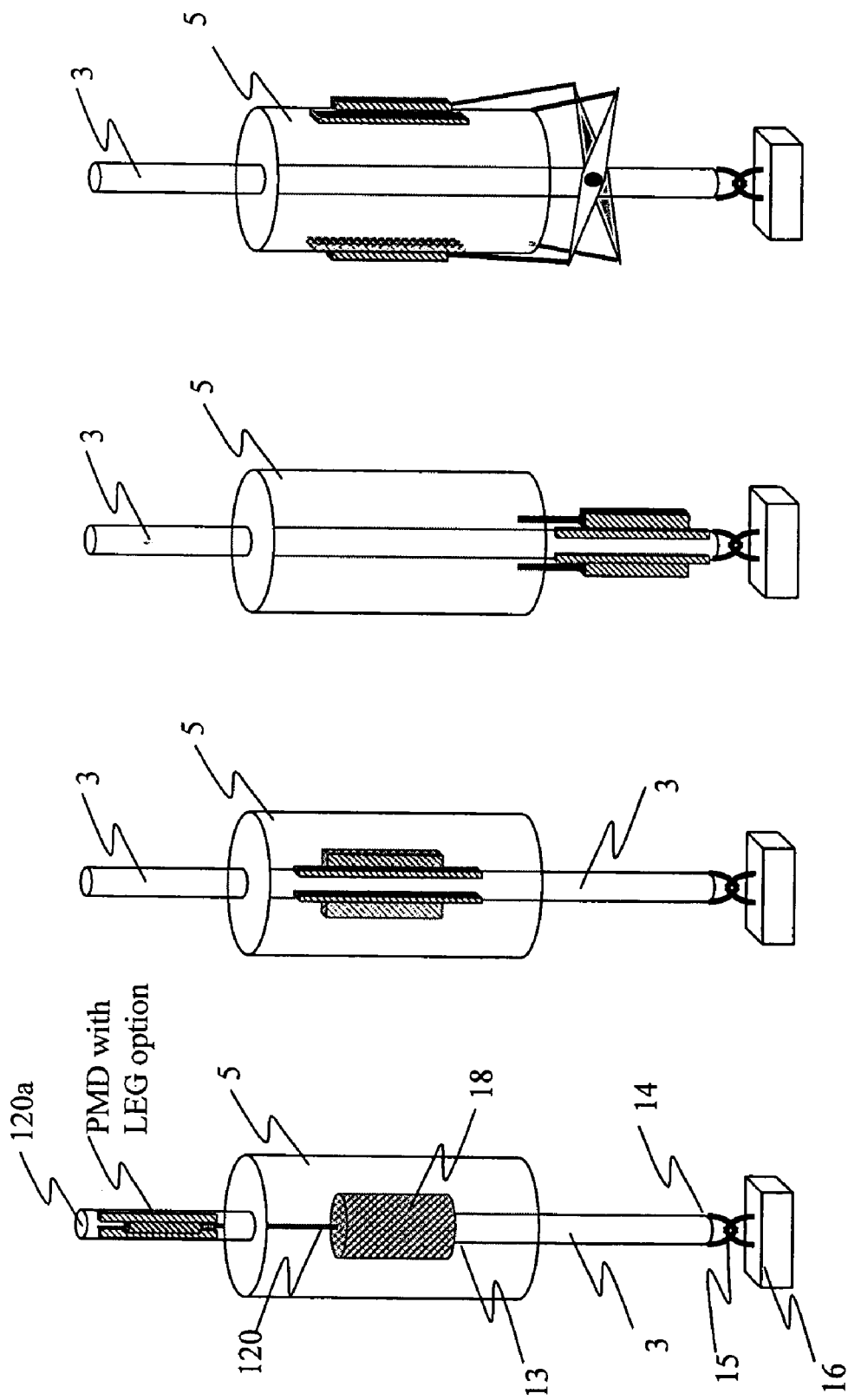

WAVE ENERGY CONVERTER (WEC) WITH MAGNETIC BRAKING

CROSS REFERENCES TO RELATED APPLICATIONS

This application claims priority from provisional patent application Ser. No. 60/553,666 titled Wave Energy Converters (WECs) with Linear Electric Generators (LEGs) filed Mar. 16, 2004, the teachings of which are incorporated herein by reference.

BACKGROUND OF THE INVENTION

This invention relates to apparatus and methods for inhibiting excessive motion between selected moving components of a wave energy converter (WEC). Known wave energy converters (WECs) include two basic components which, when placed in a body of water, are designed to move relative to each other, in response to the motion of ocean (sea) waves. One of the two components may be denoted as a "float" (or shell) and the other one of the two components may be denoted as a central "column" (shaft or spar). A power take off (PTO) device is connected between the two components to convert their relative motion into electric energy.

A problem faced by the Applicants may be explained by referring to FIG. 1 and assuming that the float 10 moves up and down along the column 12 in response to the motion of the waves and by noting that the forces due to the waves may vary considerably. For example, the forces of the waves may be of such a magnitude (e.g., during a storm) that the travel of the float relative to the column may exceed a desired "operating range" and may, if not blocked, cause separation of the float from the column. That is, the float may become detached, or torn, from the column. It is therefore desirable and/or necessary to limit the travel of the float relative to the column to a predetermined operating range. It is desirable and/or necessary to limit movement beyond the operating range to reduce the possibility of excessive motion (and potential separation) which may occur due to the extreme forces frequently present (e.g., during a storm) in seas and oceans.

To avoid the problem, the prior art relies on various hydraulic and mechanical systems (e.g., springs and/or dampers) to stop and block excessive motion. An example of a prior art system using mechanical stops is shown in FIG. 1 which illustrates a mechanical damping system in which a power take off device (PTO) is connected between the shell 10 and a central column 12 and mechanical damping means 801a, 801b, 801c and 801d are used to prevent the shell 10 from going above a certain level relative to shafthead 803 and from going below a certain level relative to the shafthead. In this type of system, there may be excessive forces applied to the stops 801a, b, c, and d. Reliance on mechanical stops and/or dampers is generally not satisfactory because of the cost and because they are subject to wear and breakdowns due to the forces applied to them. Stops and/or dampers are shown in FIG. 1, but a similar problem exists with hydraulic and/or other mechanical systems.

SUMMARY OF THE INVENTION

In accordance with the invention, the problem of excessive motion may be eased by using electromagnetic means to brake and/or dampen motion between the shell and the column when they move beyond certain points relative to each other.

Wave energy converter (WEC) systems, embodying the invention, include a magnetic braking system to prevent excessive motion between two basic components of the WEC. The WEC includes two components which, when placed in a body of water such as the ocean, move relative to each other in response to the motion of ocean (sea) waves. One of the two basic components is a float (or shell) and the other one of the two basic components is a column (shaft or spar). A power take off device (PTO) is connected between the two components to convert their relative motion into electrical energy so long as the column and float move within a predetermined operating range relative to each other. An electro-magnetic braking system embodying the invention includes a permanent magnetic assembly (PMA) attached to one of the float and column and an inductive coil assembly (ICA), or a metal plate, attached to the other one of the float and column to form a "braking" system which inhibits motion of the float relative to the column when the predetermined operating range is exceeded. The components of the "braking" system are positioned along the shaft and column such that they do not affect (or only negligibly so) the operation of the PTO in the operating range while limiting movement beyond the operating range.

In an embodiment of the invention the PTO device is a linear electric generator (LEG) which includes a permanent magnetic assembly (PMA) attached to one of the float and column of the WEC and an induction coil assembly (ICA) attached to the other one of the float and column of the WEC. So long as the shaft and shell are moving relative to each other, within the predetermined operating range, voltages are produced across the ICA, as the PMA passes over the ICA. The voltages are captured to provide the useful electrical power output of the WEC. When the movement of the shaft and shell exceeds the operating range, the PMA (or the ICA) of the PTO may be used as part of the electromagnetic braking system. In an embodiment of the invention using a LEG, first and second "braking" coil assemblies (or a first and a second copper plate), may be attached to the same WEC component as the ICA. The first braking coil assembly is located above the ICA of the PTO and the second "braking" coil assembly is located below the ICA of the PTO.

The first and second braking coil assemblies may be selectively (or automatically) short circuited when the shell and shaft move beyond the operating range and the PMA comes within the physical purview of the braking coil assemblies. By short circuiting the coils when the PMA passes opposite the "braking" coils, a high current is generated within the coil assembly generating a strong magnetic field opposing the motion of the PMA. The strong magnetic field then acts like a brake slowing, if not stopping, the movement of the PMA and the column (or float) on which it is mounted relative to the shell (or shaft) to which the coil assemblies are attached.

The use of braking coils with selectively enabled switches connected there-across enables the introduction of a selective damping system. Alternatively, the coils may be permanently short circuited. The use of metal (copper or iron or a like metal) plates provides for fixed damping as the PMA passes by the metal plates.

BRIEF DESCRIPTION OF THE DRAWINGS

In the accompanying drawings (which are not drawn to scale) like reference characters denote like components.

FIGS. 11A, 11B, 11C and 11D illustrate different WEC configurations employing LEG systems and braking systems embodying the invention.

DETAILED DESCRIPTION OF THE INVENTION

Figure 1:
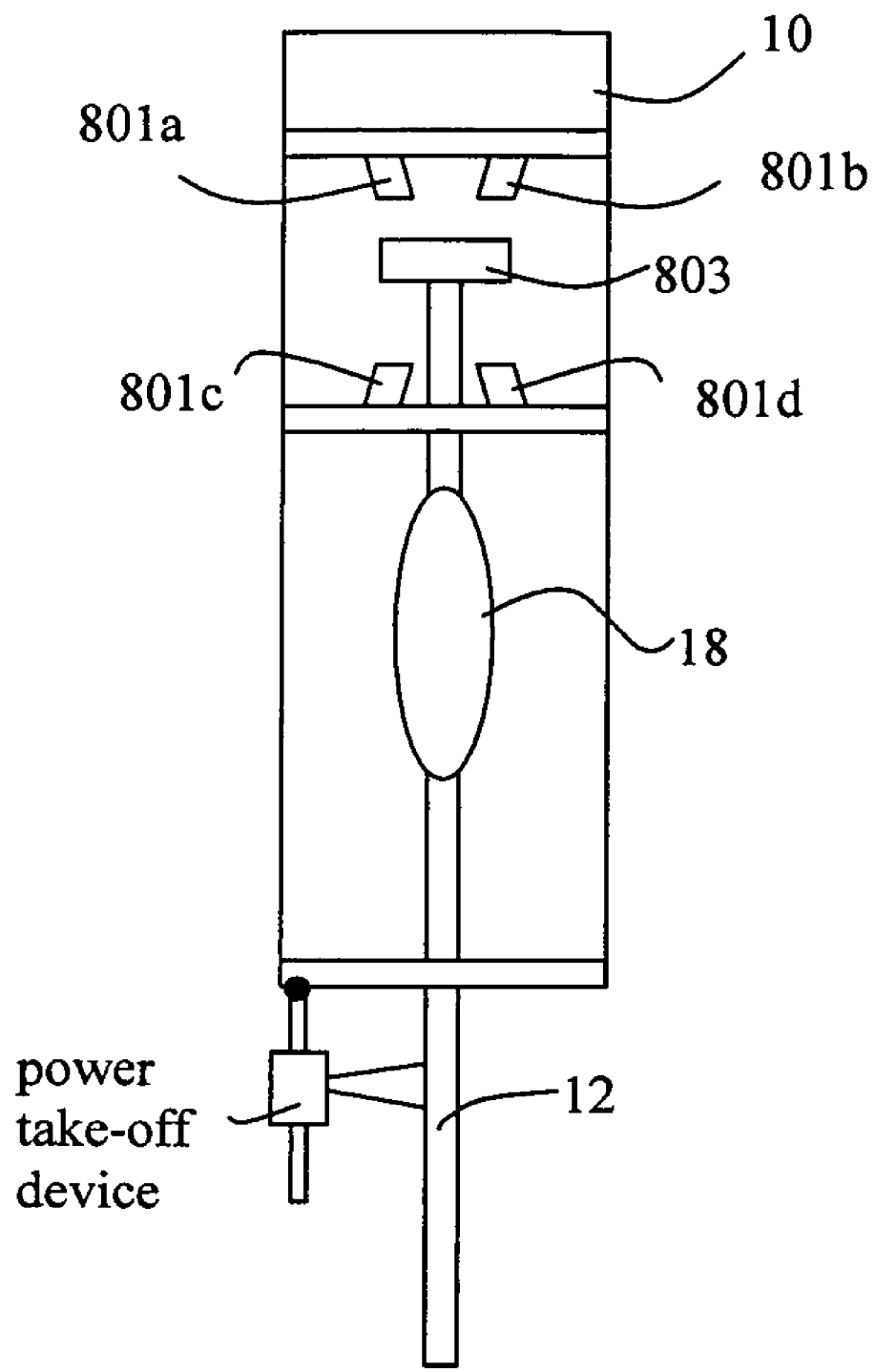
FIG. 1 is a diagram illustrating a prior art mechanical braking system.
Figure 2:
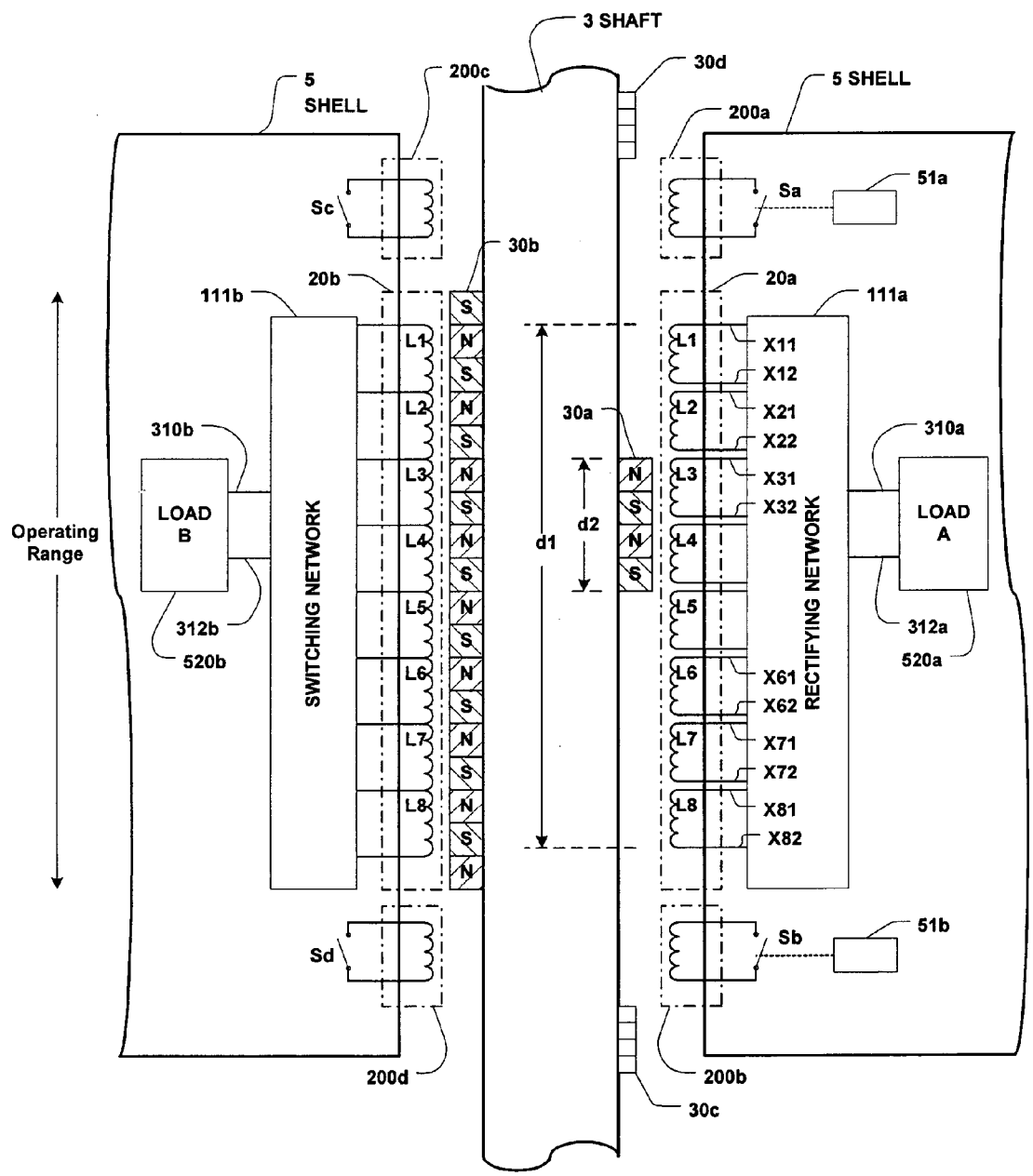
FIG. 2 is a schematic diagram of a braking system embodying the invention in which a PMA is mounted on the shaft of a WEC and the coils of the braking system are mounted on the shell of the WEC.

Referring to FIG. 2, there is shown a column 3 and a shell 5 of a wave energy converter (WEC) which may be, for example, of the type shown in FIGS. 11A, 11B, 11C and 11D and/or of any other suitable configuration. A permanent magnetic assembly (PMA) 30a is mounted on, and attached to, one side of column 3, and an induction coil assembly (ICA) 20a is mounted on, and attached to, the float 5 opposite PMA 30a. As the float 5 moves relative to the column 3 over a range defined as the "operating range", (see FIG. 1) output voltages are produced across ICA 20a. These voltages are fed to a power converter (shown to include a rectifying network 111a and a load 520a) to produce useful system voltage and current (power) output. Thus, PMA 30a and ICA 20a function as the basic elements of the power take-off (PTO) circuitry.

The PTO may also include a PMA 30b (which is shown to be much longer than 30a) and an induction coil assembly (ICA) 20b which may be of similar size to, or smaller than, ICA 20a. The ICA 20b is shown connected to a switching network 111b connected to a load 520b.

The ICA 20a is disposed along (and attached to) the shell 5 over a distance "d1" which lies within the operating range of the electric generating system. Mounted above ICA 20a (and above the operating range) is a first "braking" coil assembly 200a and mounted below ICA 20 (and below the operating range) is another "braking" coil assembly 200b. A switch Sa is connected across coil assembly 200a and a switch Sb is connected across coil assembly 200b.

In the discussion of the operation to follow it is assumed that the float (shell) 5 moves up and down relative to the column (shaft) 3. However, the opposite may well be the case (i.e., the float may be fixed and the column may move), or both the float and column may move relative to each other. In all cases, the element of the PTO and braking system attached to a component of the WEC moves with its component. That is, ICA 20a (and 20b) mounted on, and attached to, the float 5 move with the float and PMA 30a (and 30b) attached to the shaft 3 moves with the shaft. As the PMA 30a (or 30b) moves across and over the ICA 20a (or ICA 20b), voltages are induced across the coil assembly, due to the PMA 30 (or 30b) passing over the coils, which may be expressed as e=N (dφ/dt); where N is a flux coupling factor, φ is the magnetic flux between the PMA and the ICA, and dφ/dt is the change in flux as a function of the change in time. These induced voltages are captured by rectifying network 111a (or a switching network 111b) and processed and fed via output lines 310a, 312a (or 310b, 312b) to a power converter 520a (or 520b) to produce output voltages which are a function of the relative motion of the float and column. The output voltages also may be used to drive any suitable load coupled to the output lines.

In response to ocean waves, it is desired that there be movement of the float relative to the column so long as the movement and displacement is controlled and such that the PMA 30a and the ICA 20a move within a prescribed operating range within which useful energy is generated. However, when the displacement between the column 3 and the float 5 exceeds the prescribed operating range and the float (or column) moves outside of the desired range of the PTO, it is then desirable, and/or necessary, to limit the further excursion of the float (or column) relative to the column (or float).

In the system of FIG. 2, motion of the shell and column relative to each other when they move outside a prescribed operating range may be limited or inhibited by the timely closing of switches Sa or Sb which activate the braking system. For example, switch Sa is closed when the ICA 20a (and the float) falls below a predetermined point (or PMA 30a rises above the top end of the operating range) and switch Sb is closed when the ICA 20a (and the float) rises above a predetermined point (or PMA 30a descends below the lower end of the operating range). Typically, as the shaft and shell move such that PMA 30a comes near to, and passes across, the braking coils 200a, a large voltage is induced across the coils 200a due to the PMA 30a passing over the coils. When a short circuit is applied across the coils 200a by closing switch Sa, a high circulating current is generated within coil 200a. This high current generates a magnetic field which opposes the further upward motion of ICA 20a (and the shell on which it is mounted) relative to the PMA 30a (and the shaft on which it is mounted) and tends to prevent further movement of the float relative to the column. Energy is also being dissipated aiding in the braking action.

In a similar manner, when the shaft and shell move such that PMA 30a comes near to, and passes across, the "braking" coils 200b a large voltage is induced across the coils 200b due to the passing PMA 30a. When a short circuit is applied across the coils 200b by closing switch Sb, a high circulating current is generated within coil 200b. This high current generates a magnetic field which opposes the further motion of ICA 20a (and the shell to which it is attached) relative to PMA 30a (and the shaft to which it is attached). Thus coil assemblies 200a and 200b provide a very efficient magnetic brake to prevent excessive movement of the shaft (column) relative to the float (shell) beyond a desired operating range.

In FIG. 2, PMA 30a has a length d2 which is much shorter than the length d1 over which the ICA 20a is disposed. In systems using linear electric generators (LEGs) and a magnetic braking system, the PMA may be equal to or greater in length than the ICA as shown for PMA 30b and ICA 20b. Also, the circuitry for converting and processing the output of the ICA may be a switching circuit (e.g., 111b) or a rectifying circuit (e.g., 111a).

The invention is illustrated using a linear electric generator (LEG) functioning as the power take off device (PTO) of a WEC. The magnetic braking system of the invention may be used with the different WEC structures shown in FIGS. 11A–11D and with different power take off (PTO) systems using different types of LEGs as described in greater detail in co-pending applications assigned to the same assignee as the assignee of this application and whose teaching are incorporated herein by reference: a) Active Impedance Matching Systems and Methods For Wave Energy Converter, Ser. No. 11/035,323 filed Jan. 3, 2005; b) Coil Switching Circuit For Linear Electric Generator, Ser. No. 11/030,932 filed Jan. 7, 2005; and c) Circuitry For Increasing Efficiency Of A Linear Electric Generator, Ser. No. 11/030,933 filed Jan. 7, 2005.

An advantage of the "braking" system of FIG. 2 is that the same, or similar, technology (i.e., coils and magnets) is used for the PTO and for the braking system. However, it should be appreciated that the braking system of the invention may be used with any suitable PTO and in many systems where two components move relative to each other. This is so, as long as the components (e.g., shaft and shell) are configured such that a PMA may be attached to one of the components and a braking coil assembly can be attached to the other component and the two components move relative to each other such that the PMA passes along the "braking" coil assembly to allow for the generation of the counter (braking) force.

The ICA 20 may be formed of a "tapped" coil configuration (e.g., 20b) or a segmented (e.g., 20a) coil configuration. As the PMA (30a and/or 30b) pass along and over the ICA (20a and/or 20b), within the operating range, voltages are induced in the coils which are in close proximity to the passing PMA. The voltages induced in the coils are coupled via a rectifying network (e.g., 111a) or a switching network (e.g., 111b) to a load (e.g., 520a or 520b) which may include circuitry for further processing the captured electrical energy.

By positioning "braking" coils (e.g., 200a, 200b) above and below the ICAs (20a and 20b), a "braking" system is provided which can inhibit the movement of the shaft (shell) relative to the shell (shaft). Thus, when the shell (or shaft) moves outside the "operating range" relative to the shaft (or shell) and beyond a prescribed level, the electromagnetic braking assembly, whose elements are mounted on the shell and the shaft, tends to lock the shell and shaft together and inhibits the shell (or shaft) from moving further relative to the shaft (or shell). Once the shell and shaft are locked together, the shaft and shell will then move in unison, until the magnetic field decreases in intensity or the switches (Sa or Sb) are opened. Note that additional braking coils 200c and 200d may be, respectively, positioned above and below ICA 20b. These additional braking coils are designed to interact with PMA 30b.

Switches Sa and Sb (and Sc and Sd) shown connected across the braking coils may be implemented using any suitable switches. For example, these switches may be of the type shown and taught in the referenced applications assigned to the present assignee, whose teachings are incorporated herein, and they may be controlled and caused to function as taught therein. In brief, as shown and taught in the cited references, these switches (e.g., Sa, Sb, Sc, Sd) may be turned on and off by means of position sensors (51a, 51b) which may include apparatus for sensing the physical position of the shell relative to the column.

Thus, the "braking" switches (e.g., Sa, Sb, Sc, Sd) may be turned on and off by means of position sensors located along the shaft and/or shell which would then provide position signals to sensor circuitry included in sensors 51a, 51b. Alternatively, sensors 51a, 51b may be voltage sensors which sense the voltage developed across selected coils of the ICA and/or the braking coils to ascertain the position of the PMA relative to the ICA to then close the switches (e.g., Sa, Sb) and to then short out the braking coils. Thus, the switches shorting the braking coils may be turned on and off as a function of sensing the voltages being generated in various coils to ascertain the relative position of the shaft and shell.

Position control may be necessary where the PMA is relatively long compared top the length of the ICA; and, more so, if the PMA is longer than the length over which the ICA is disposed. It should be appreciated that additional braking magnets 30c, 30d may be used to provide additional braking action, if needed.

It should be appreciated that once the PMA no longer moves relative to the coils that the voltage induced in the coils goes towards zero That is, the braking coils will function to provide braking action when there is movement between the PMA and the braking coils. However, after accomplishing the braking action the voltage across the braking coil and the current through it goes towards zero and the shaft and shell are then released. Therefore, it is possible to have the braking coils permanently shorted (particularly where the PMA is short relative to the ICA), as shown for coils 200e and 200f in FIG. 3. Thus, a highly passive system with permanently shorted coils may be used to practice the invention.

Figure 3:
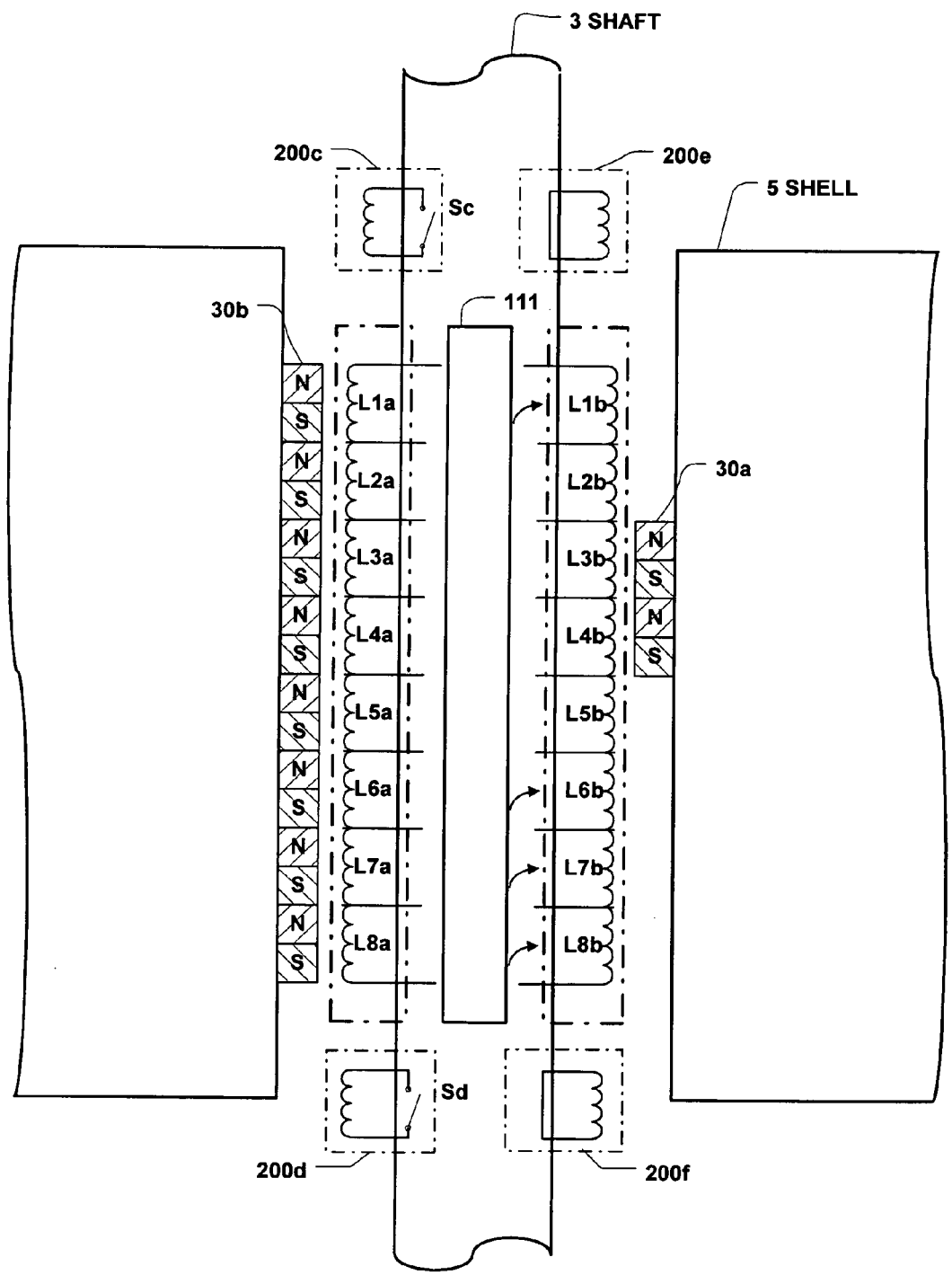
FIG. 3 is a schematic diagram of a braking system embodying the invention, in which a PMA is mounted on the shell of a WEC and the coils of the braking system are mounted on the shaft of the WEC.

FIG. 3 also illustrates that the induction coil and braking coil assemblies may be mounted on the shaft 3 and the PMA assemblies may be mounted on the shell 5. Otherwise, the operation of the system of FIG. 3 is similar to that of FIG. 2.

Figure 4:
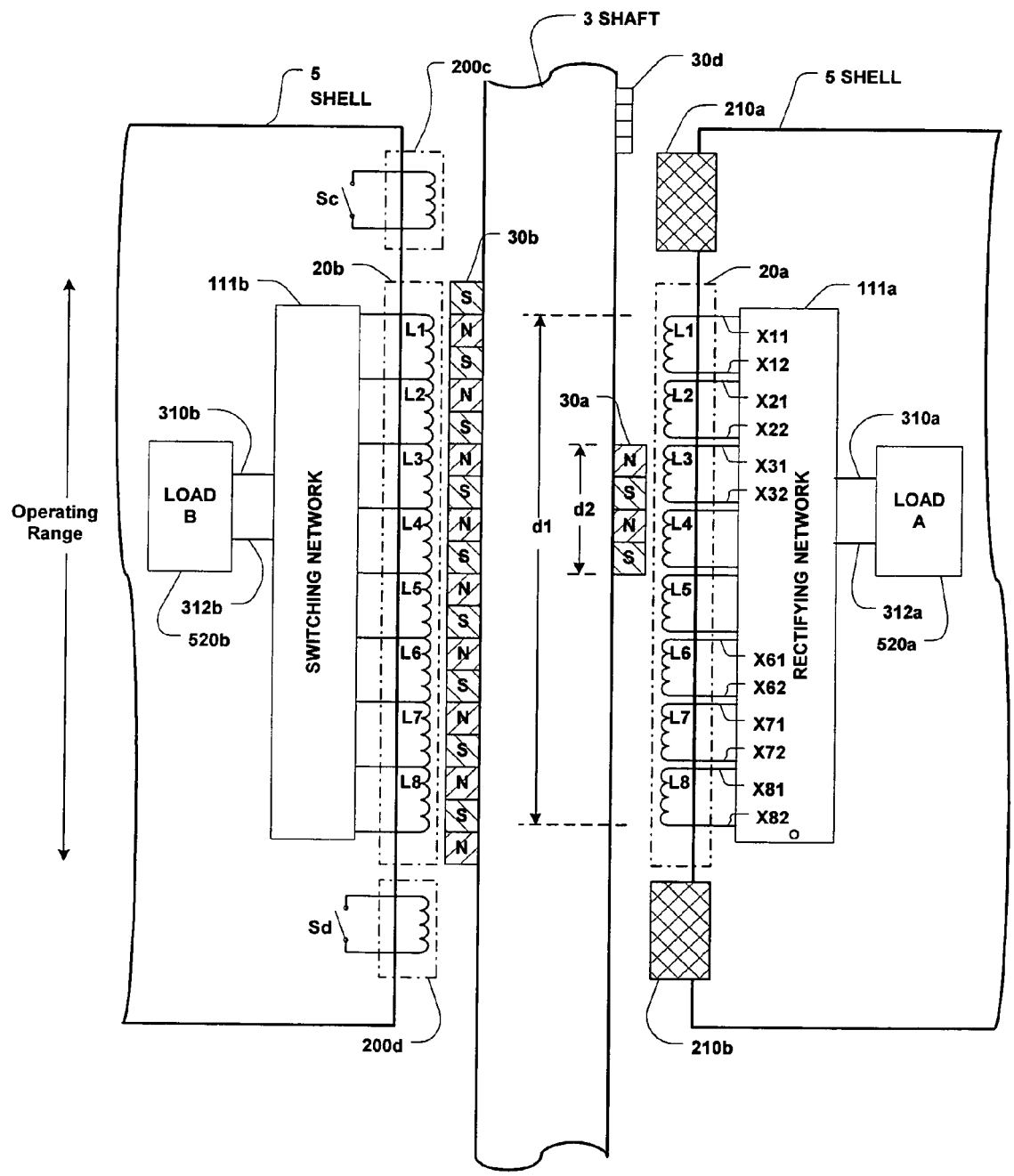
FIG. 4 is a schematic diagram of a braking system embodying the invention in which metallic plates, disposed above and below the induction coil assembly of the PTO, interact with the PMA to dampen travel.

In FIG. 4 a metal plate 210a is mounted above the ICA 20a and a metal plate 210b is mounted below ICA 20a. The metal plates may be of iron or copper or like materials having high electric conductivity. When the PMA 30a comes in close proximity to the metal plates 210a or 210b, strong electro-magnetic forces are generated opposing the motion and inhibiting further movement and/or displacement. The interaction between the PMA and the metal plates is such that the shaft (or shell) on which the PMA is mounted and to which it is attached will be held in place relative to the metal plate (210a, 210b) and the shell (shaft) on which the metal plate is attached. The magnetic attraction will inhibit further motion between these two shell and the shaft. In addition, the system may also include coil assemblies 200c and 200d with switches Sc and Sd which would provide selective application of the braking system, as described above.

Different systems for implementing the invention are shown in FIGS. 5–8. The different systems may include the use of a PTO comprising a LEG with an ICA 20 and a PMA 30. The PMA 30 used for generating useful electrical voltages and for use in the braking system may be formed with either (a) surface magnets; (b) buried magnets; or (c) any other suitable configuration including hybrid-permanent magnet/core structures and electromagnets. The electromagnetic braking assembly may include either: (a) a braking coil assembly where the coils are selectively shorted; (b) a braking coil assembly where the coils are permanently shorted; or (c) the braking assembly includes a conductive (metal) plate; or any other suitable configuration.

Figure 5A:
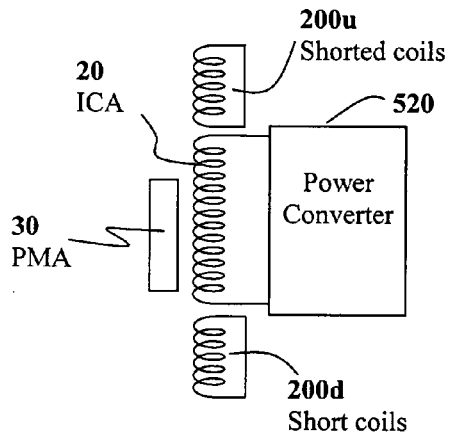
FIG. 5A is a schematic diagram showing the PTO to be a LEG including an ICA coil assembly and a surface magnet PMA to interact with shorted braking coil assemblies.

FIG. 5A shows a LEG assembly which includes a PMA 30 formed with surface magnets (see FIG. 5B) and an ICA 20 to generate voltages supplied to a power converter 520. The PMA 30 is connected to one of the shell and column and the ICA 20 is connected to the other one of the shell and column. As described above, the ICA 20 and the PMA move relative to each other within the operating range and the voltages generated across the coils are supplied to the power converter, or any other suitable load. Braking coil assemblies 200u and 200d are, respectively, formed above and below coil assembly 20. The coils of assemblies 200u and 200d are shown as being shorted. Alternatively, as discussed above, the coils 200u and 200d may be selectively shorted by means of a switch connected across the coils to selectively generate a short circuit condition when the PMA moves in close proximity to the braking coils 200u, 200d.

In operation, when the PMA 30 travels in an upward direction beyond the coil assembly 20 and passes over the coil region denoted as 200u, a very strong electromagnetic force is generated opposing the motion of the magnetic assembly relative to the shorted coils and tending to prevent the magnetic assembly from moving up beyond the shorted coil region. This tends to cause the shell and column on which the magnets and coils are attached to be locked into position vis-as-vis each other. Concurrently any current induced in the coil windings cause much energy to be dissipated in the form of heat.

In a similar manner, when the PMA 30 travels in a downward direction beyond the ICA 20 and passes over the coil region denoted as 200d, a very large electromagnetic force is generated opposing the motion of the magnetic assembly relative to the shorted coils and tending to prevent the magnetic assembly from moving down beyond the coil assembly.

Figure 5B:
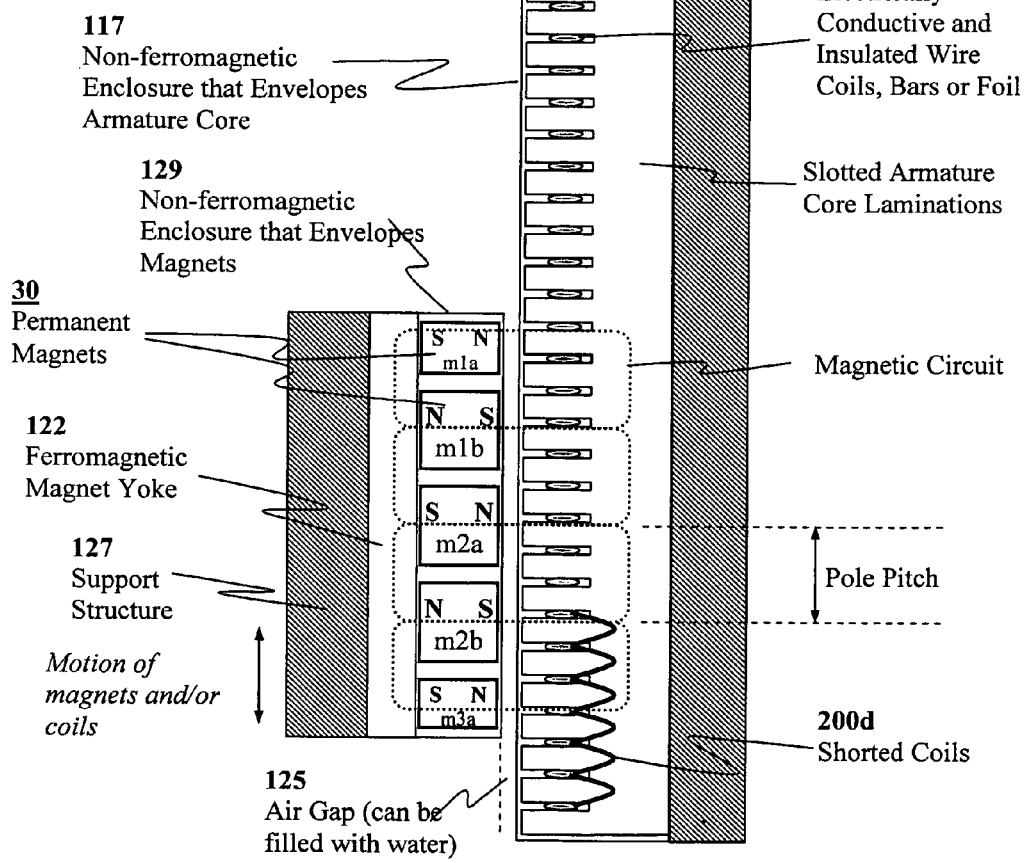
FIG. 5B is a cross-sectional diagram of a structure implementing the system of FIG. 5A.

FIG. 5B is a (not to scale) cross-sectional diagram of a structure for implementing ICA 20, the braking coil assemblies 200u, 200d and the PMA 30. The coil (or stator) assemblies include a support structure 123, which may include an optional ferromagnetic yoke, on which is mounted, or formed, a slotted armature core with laminations. The coils may be electrically conductive insulated wire coils or bars or foil. The coils are wound within the slots. In FIG. 5B the coils corresponding to braking coils 200u and 200d are shown to be shorted. A non-ferromagnetic enclosure 117 is formed to envelop the armature core to protect it from the elements and from rubbing. The coil assembly is separated from the PMA by an air gap 125. In FIG. 5B, the PMA includes a support structure 127 on which is mounted a ferromagnetic yoke 122 within which are mounted permanent magnets mia, mib. A non-ferromagnetic enclosure 129 is formed to envelop the PMA so as to protect it.

Figure 6A:
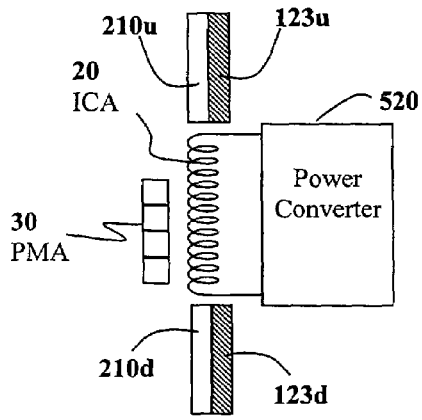
FIG. 6A is a schematic diagram showing the PTO to be a LEG including an ICA and a surface magnet PMA with reaction plates for providing braking.
Figure 6B:
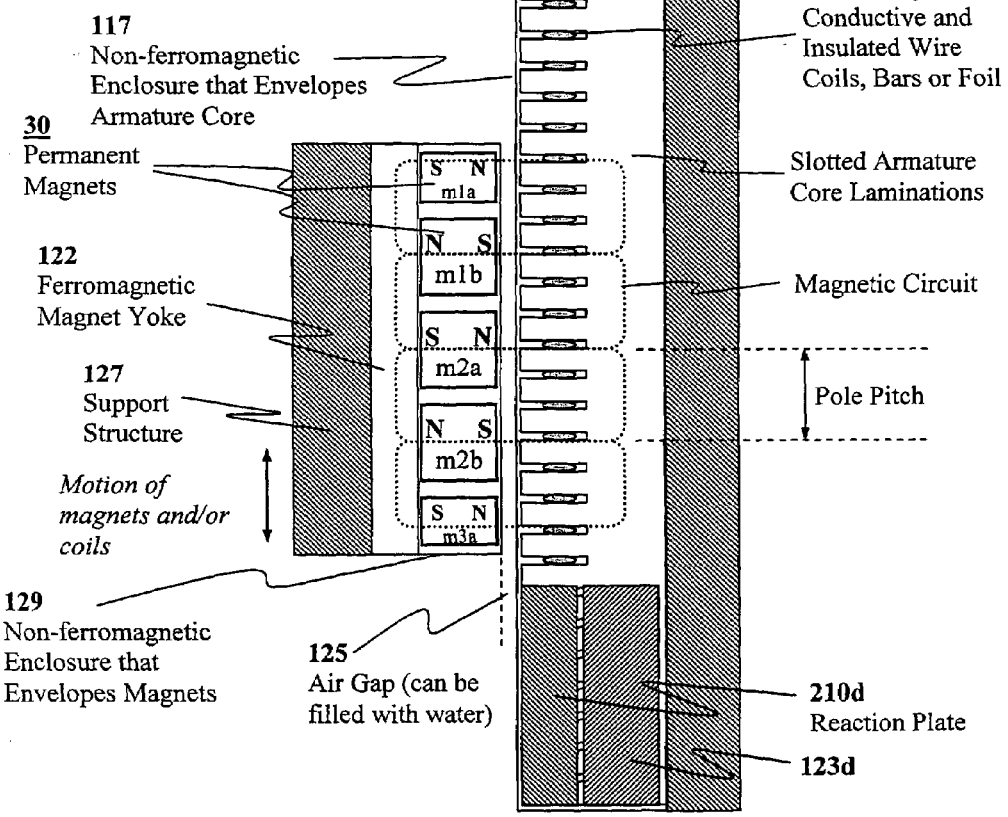
FIG. 6B is a cross-sectional diagram of a structure implementing the system of FIG. 6A.

In FIG. 6A, the shorted coil assemblies of FIG. 5A are replaced by reaction plates 210u and 210d. The reaction plates are of a highly conductive material (e.g., copper) to induce an electromagnetic braking/damping force of a similar type to that developed with the shorted coils of FIG. 5A. Note that the braking effect can be enhanced by adding ferromagnetic materials 123u or 123d behind the reaction plates 210. FIG. 6B is a cross sectional diagram (not to scale) of a structure for implementing the system of FIG. 6A. In FIG. 6B, the reaction plates 210u and 210d are mounted on the support structure 123.

Figure 7:
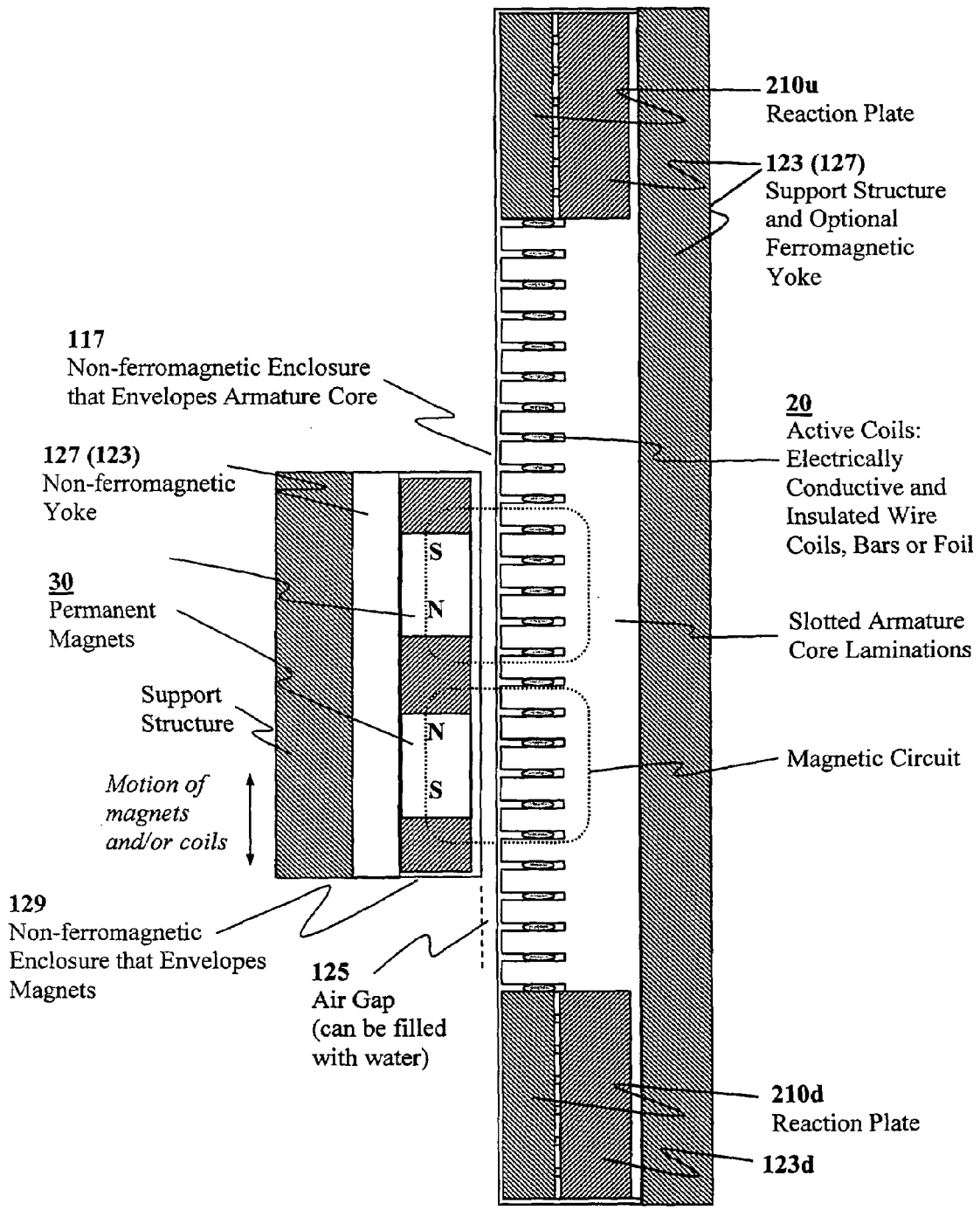
FIG. 7 is a cross-sectional diagram of another structure for implementing the system of FIG. 6A, where the PMA is formed using "buried" magnets.
Figure 8:
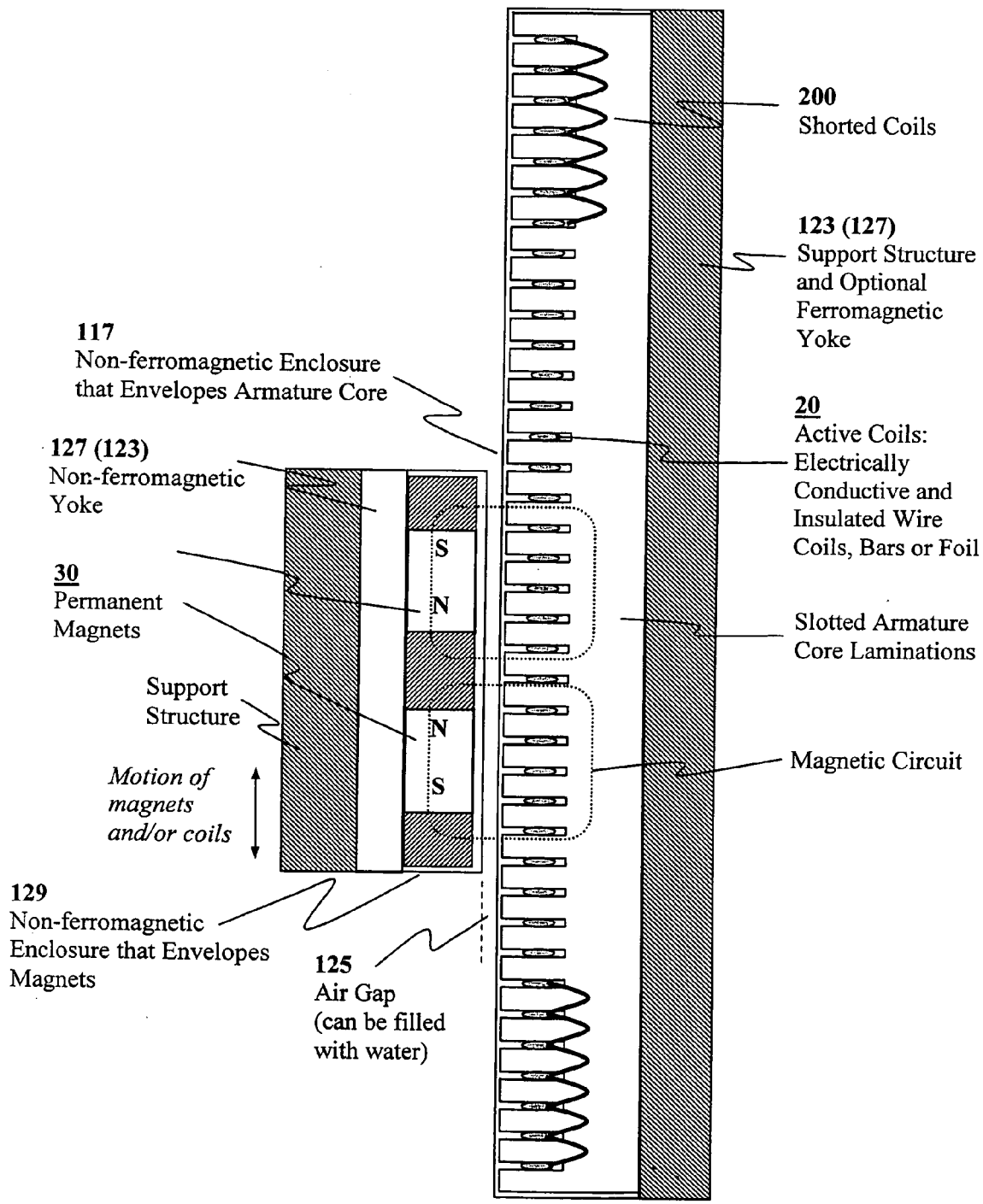
FIG. 8 is a cross-sectional diagram of another structure for implementing the system of FIG. 5A, where the PMA is formed using "buried" magnets.

In FIG. 7 there is a coil assembly 20 and reaction plates 210u and 210d as in FIGS. 6A and 6B. However, FIG. 7 shows that the PMA may be formed using a buried permanent magnet configuration which in some instances may be more efficient and /or easier to manufacture than buried surface magnets. FIG. 8 shows a structure in which the PMA is formed using buried magnets, and the "braking" coil assemblies are shorted.

Figures 9A, 9B:
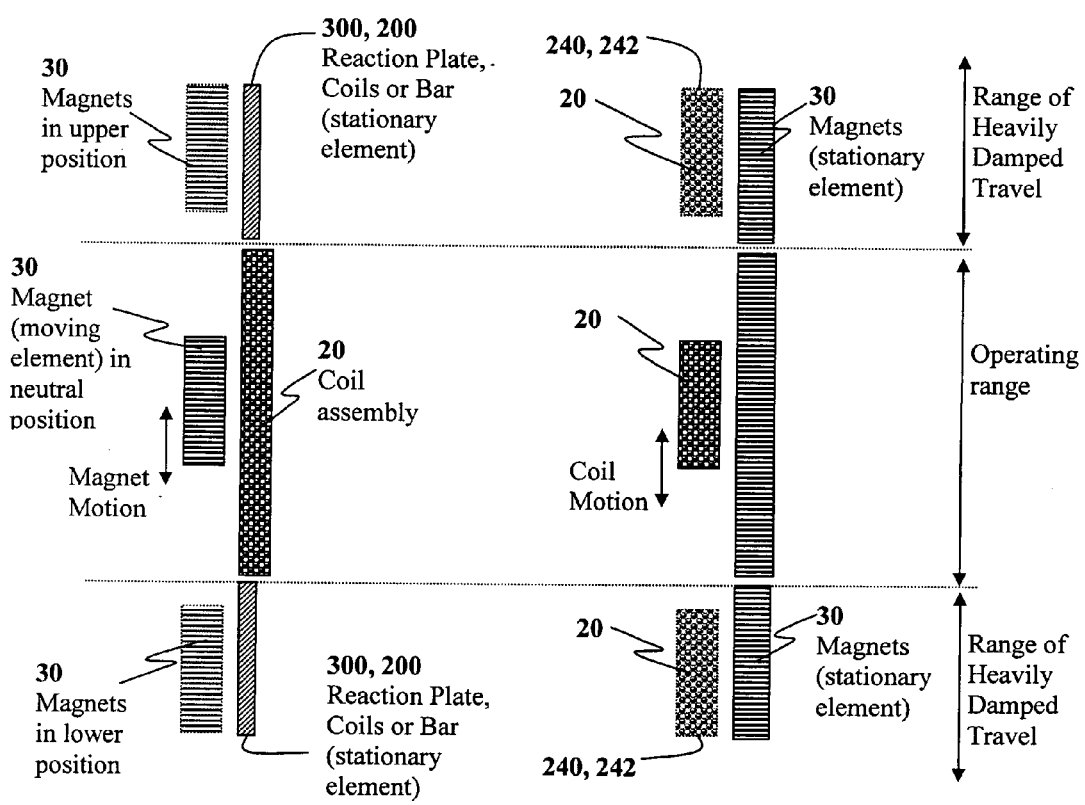
FIG. 9A illustrates the condition of a moving PMA and a stationary reaction plate or coil assembly where the PTO is a LEG.
FIG. 9B illustrates the condition of a moving reaction plate or coil assembly and a stationary PMA where the PTO is a LEG.

FIGS. 9A and 9B illustrate the range of undamped travel and range of damped travel of the shell and column due to the braking effect of the LEG assemblies, using LEGs as the PTO device. When the magnet assemblies (FIG. 9A) and/or the coil assemblies (FIG. 9B) exceed the range of undamped (or partially undamped) travel the electromagnetic braking comes into play causing a range of heavily damped travel and tending to limit any further travel of the shell relative to the column. These structures and systems make use of the existing magnets and coils used to generate electrical energy and/or or like magnet/coil assemblies and by the addition of a few similar components function to introduce a very effective braking/damping system to protect the WEC during heavy seas and storm conditions which require that the WEC be placed in a protective mode (e.g., lock-down condition). As noted above, the coils to provide dynamic braking may be selectively shorted or permanently shorted.

Figures 9C, 9D:
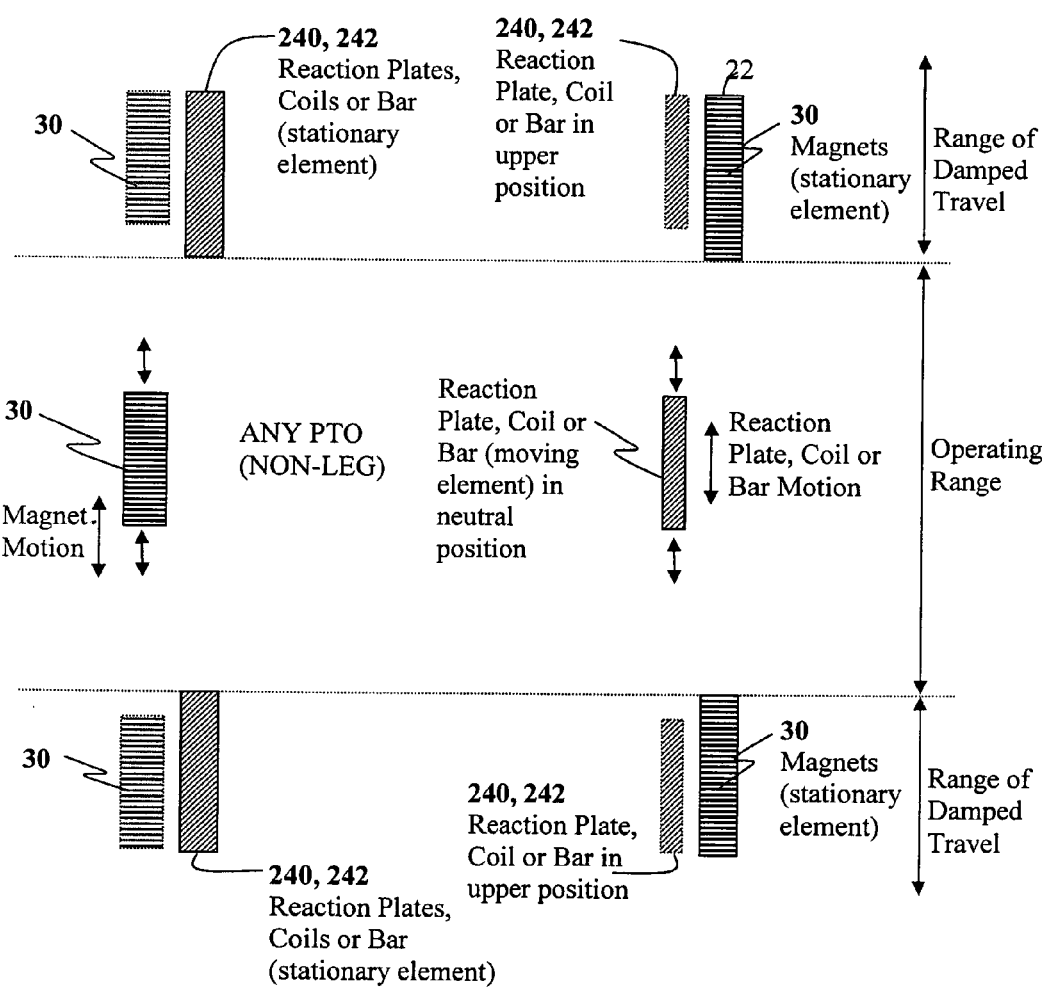
FIG. 9C illustrates the condition of a moving PMA and a stationary reaction plate or coil assembly where the PTO may be a system other than a LEG.
FIG. 9D illustrates the condition of a moving reaction plate or coil assembly and a stationary PMA where the PTO may be a system other than a LEG.

FIGS. 9C and 9D illustrate that in a magnetic braking system, the PTO device may be any suitable means (e.g., hydraulic or electromagnetic) for converting the relative motion of the shell and column into useful electrical energy. However, an electromagnetic arrangement of magnets and coils (or reaction plates) may be used to provide the braking/damping when the distance of travel between the shell and column exceeds a predetermined value. Thus during the indicated range of "undamped travel", any PTO device may be used to convert the mechanical motion between the shell and column to electrical energy. It should be understood that in the "undamped" travel region there is some damping due to the extraction of power by the system. However, this damping is done to extract useful power and not to try to stop the system part from moving relative to each other. Clearly, when the travel of the shell exceeds the "undamped" range the electromagnetic damping system comprising of magnetic assemblies and reaction plates or shorted coil assemblies are used to provide braking/damping of the shell and coil to which the magnetic assemblies and the coils are attached in order to prevent movement between the shell and central column.

Figure 10:
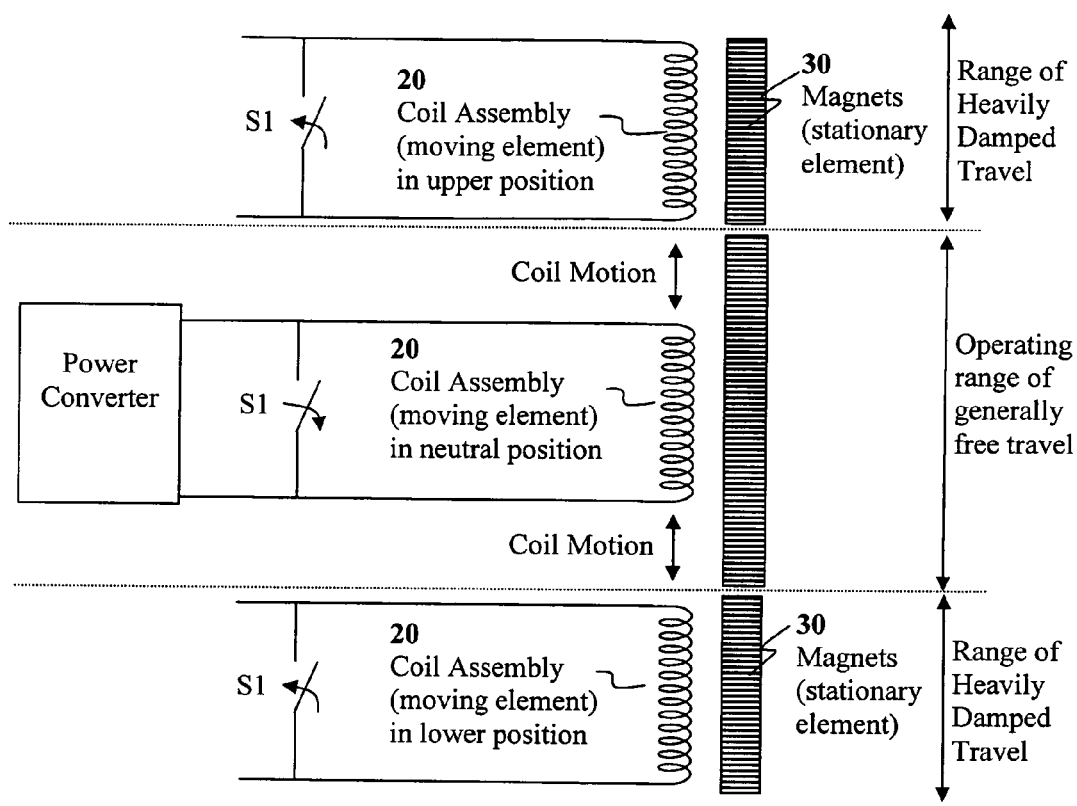
FIG. 10 is a schematic diagram of a braking system embodying the invention where the PTO is a LEG and where the ICA of the PTO is used to provide braking action in combination with the PMA of the LEG.

FIG. 10 illustrates that the ICA 20 of the PTO may be used as part of the braking mechanism when the coil assembly (or the PMA) moves outside the operating range. Thus a switch S1 shown connected across the coil assembly 20 would be closed, creating a short circuit across the coils, when the coil assembly (and or the PMA or a PMA) is above or below the operating range. This switching function can also be performed by switches (not shown) integral to the power converter.

Although the invention has been illustrated using a single phase, the invention is contemplated for use in multi-phase (e.g., three-phase) systems.

What is claimed is:

1. A wave energy converter (WEC) with magnetic braking comprising:
   a float and a column intended to be placed in a body of water with the float and column moving relative to each other as a function of waves present in the body of water;
   a permanent magnet assembly (PMA) mounted on one of the column and float and an induction coil assembly (ICA) mounted on the other one of the column and float for causing voltages to be generated across the induction coil assembly when the PMA and the ICA, mounted on the float and column move relative to each other within a given operating range, defining an active power generating range, whereby the relative movement of the float and column is converted into electrical energy; and
   magnetic apparatus mounted above and below the induction coil assembly for inhibiting movement of the column relative to the float when the PMA moves above or below the ICA, outside the active power generating range.

2. A WEC as claimed in claim 1, wherein said magnetic apparatus includes a first electrically conductive metal plate, mounted above the ICA, for generating a magnetic field between the PMA and said first plate when the PMA is in close proximity to said first plate of a nature to inhibit movement of the float relative to the column beyond said operating range; and a second electrically conductive metal plate mounted below the ICA for generating a magnetic field between the PMA and said second plate when the PMA is in close proximity to said second plate of a nature to inhibit movement of the float relative to the column beyond said operating range.

3. A WEC as claimed in claim 1, wherein said magnetic apparatus includes a first braking coil assembly mounted above the ICA for generating a large magnetic field between the PMA and said first braking coil assembly of a nature to inhibit movement of the column relative to the float when the PMA is in close proximity to said first braking coil assembly; and a second braking coil assembly mounted below the ICA for generating a large magnetic field between the PMA and said second braking coil assembly of a nature to inhibit movement of the column relative to the float when the PMA is in close proximity to said second braking coil assembly.

4. A WEC as claimed in claim 3 wherein a selectively enabled switch is connected across each braking coil assembly for selectively short circuiting the braking coil assembly across which the switch is connected.

5. A WEC as claimed in claim 4 wherein said WEC includes means for sensing the position of at least one of the PMA and the ICA for controlling a turn-on and a turn-off of the selectively enabled switches connected across the braking coil assemblies.

6. A WEC as claimed in claim 3 wherein each one of the first and second braking coil assembly is short circuited.

7. A WEC as claimed in claim 1, wherein said PMA is mounted on one of the column and float and the ICA is mounted on the other one of the column and float, and wherein the column can move up and down relative to the float.

8. A WEC as claimed in claim 1 wherein the column is stationary and the float moves up and down relative to the column.

9. A WEC as claimed in claim 1 wherein the column and the float can both move relative to each other.

10. A WEC as claimed in claim 1 wherein the float is stationary and the column moves up and down relative to the float.

11. A wave energy converter (WEC) comprising:
    a float and a column intended to be placed in a body of water with the float and column moving relative to each other as a function of waves present in the body of water;
    a permanent magnet assembly (PMA) attached to a section of the column and float and a first coil assembly attached to a first section of the other one of the column and float; said PMA and first coil assembly being magnetically coupled for causing voltages to be generated across the first coil assembly when the float and column move relative to each other within a given operating range; and
    a second coil assembly mounted above the first section and a third coil assembly mounted below the first section of the other one of the column and float, said second and third coil assemblies interacting with the PMA so as to inhibit movement of the column relative to the float when the PMA moves above or below the first section, beyond said operating range.

12. A WEC as claimed in claim 11, wherein a first normally open switch is connected across the second coil assembly and wherein the switch is selectively closed for applying a short circuit across the second coil assembly when the PMA moves so as to be near the second coil assembly; and wherein a second normally open switch is connected across the third coil assembly and wherein the switch is selectively closed for applying a short circuit across the third coil assembly when the PMA moves so as to be near the third coil assembly.

13. A WEC as claimed in claim 12, wherein the PMA is mounted on the column and the coil assemblies are mounted on the float.

14. A WEC as claimed in claim 12, wherein the PMA is mounted on the float and the coil assemblies are mounted on the column.

15. A combination comprising
    a float and a column intended to move relative to each other as a function of external forces applied to them;
    a power take off device (PTO) connected between the float and the column responsive to the movement between the float and the column for converting their relative motion to electrical energy so long as they move within an operating range; and
    means for limiting the relative motion between the float and column outside the operating range, said limiting means including a permanent magnetic assembly (PMA) attached to one of the column and float and a braking coil assembly (BCA) attached to the other one of the column and float for causing voltages to be generated across the BCA when the PMA and the BCA are in close proximity such that electromagnetic forces are generated opposing motion of the float relative to the column outside of the operating range.

16. The combination as claimed in claim 15 wherein the PTO is a linear electric generator.

* * * * *